April 17, 1956  E. P. WASHABAUGH  2,742,077
MACHINE FOR SHAPING AN ELLIPTICAL WIRE CAGE
Filed Aug. 8, 1952  2 Sheets-Sheet 1
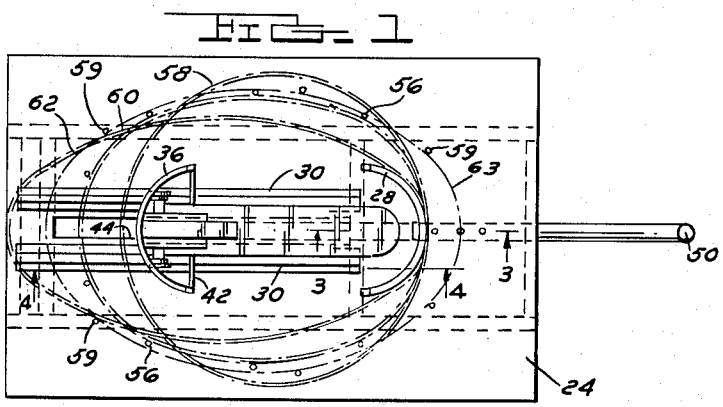
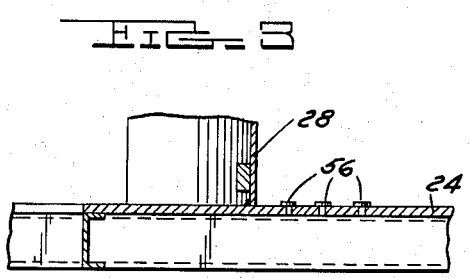
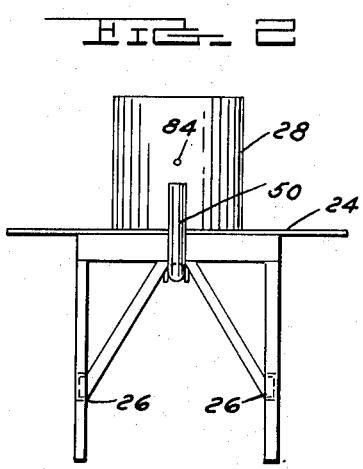
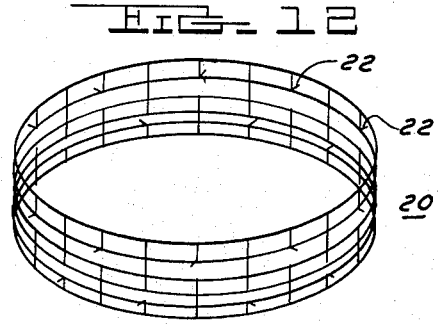
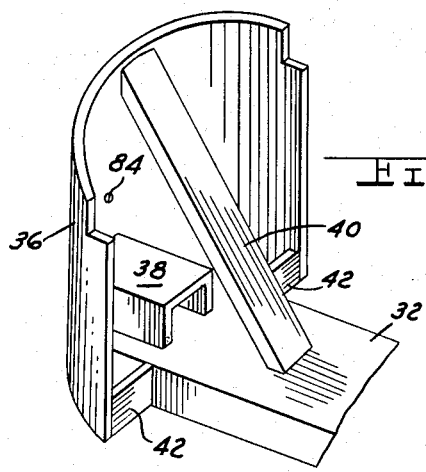
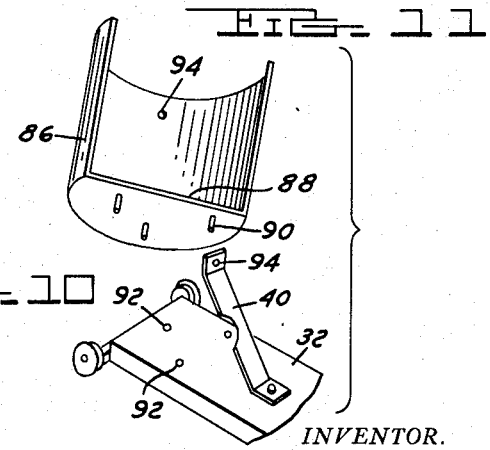
INVENTOR.
EDWARD P. WASHABAUGH
BY
Burton & Parker
ATTORNEYS

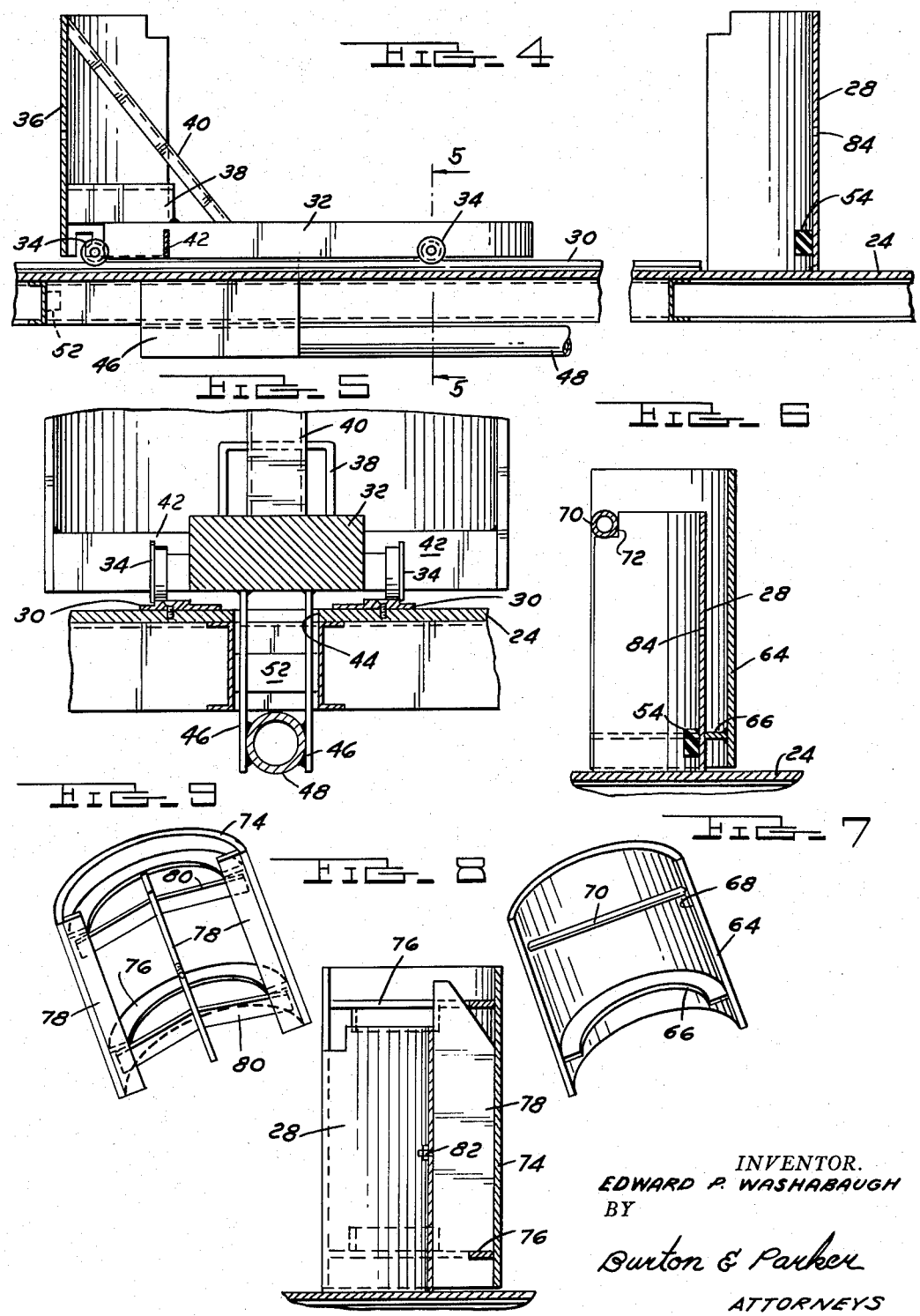

United States Patent Office 2,742,077
Patented Apr. 17, 1956

2,742,077

MACHINE FOR SHAPING AN ELLIPTICAL WIRE CAGE

Edward P. Washabaugh, Saginaw, Mich., assignor to American-Marietta Company, Chicago, Ill., a corporation of Illinois Application August 8, 1952, Serial No. 303,365

4 Claims. (Cl. 153—35)

This invention relates to mechanism for shaping a wire cage of the character commonly used to reinforce concrete pipe and to an improved method or process for shaping a circular wire cage into an elliptical form.

Concrete pipe particularly in large diameters is commonly reinforced by the insertion therein of a continuous wire cage having the shape of the pipe. If such pipe is circular in shape a circular wire cage is used. This wire cage is formed of wire mesh of a gauge dependent upon the size of the pipe and it is common practice in pipe of large diameter to use two wire cages. One wire cage is embedded in the concrete in proximity to the inner circumference of the pipe. The other cage is embedded in the concrete in proximity to the outer circumference of the pipe. If the pipe is formed in a shape other than circular, for example elliptical, the wire cage must be similarly shaped to be properly received therein.

Inasmuch as these wire cages are commonly formed of wire mesh of relatively heavy gage which wire mesh is commonly provided in large rolls, it is the practice to remove the desired length of wire mesh from the roll and fasten the ends together. The resulting cage will then be substantially circular in shape. It has been found that when an attempt is made to reform this circular cage into elliptical shape by exerting pressure or compression thereupon from the outside that the wire of the cage does not bend evenly and the resulting ellipse is not of uniform contour.

This invention relates to a machine designed for use in shaping of a circular wire cage into an elliptical form. The machine is so constructed and arranged that a circular wire cage may be quickly and easily brought into an elliptical form of even contour. The machine is so designed that different sizes of wire cages may be shaped thereby and they may be shaped into ellipses which differ from one another as to dimension and contour.

An object is to provide a machine of this character which is simple, inexpensive and capable of being employed by unskilled labor with satisfactory results.

Another object is the provision of a machine of the character set forth wherein the shapers or forming members which act upon the wire cage are supported to act upon the interior of the cage and do not engage the exterior thereof. It is common practice to provide such wire cages with wires which project radially externally therefrom to be embedded within concrete and the machine is so constructed that a cage provided with such wires may be received within the machine and shaped to the proper form without interference from the projecting wires.

Another object is the provision of an improved process for shaping a circular wire cage into an elliptical form quickly, easily and accurately and without bending or deforming the wire in an undesirable manner.

Other objects, advantages and meritorious features will appear from the following description, claims and accompanying drawings, wherein:

Fig. 1 is a plan view of mechanism embodying the invention;

Fig. 2 is an end view of the structure shown in Fig. 1;

Fig. 3 is a fragmentary vertical sectional view taken on the line 3—3 of Fig. 1;

Fig. 4 is a fragmentary vertical sectional view taken on the line 4—4 of Fig. 1;

Fig. 5 is a fragmentary vertical sectional view taken on the line 5—5 of Fig. 4;

Fig. 6 is a fragmentary vertical sectional view through one shaper member supplemented by a second shaper member disposed thereupon;

Fig. 7 is a perspective of the supplemental shaper member shown in Fig. 6;

Fig. 8 is a vertical sectional view through a supplemental shaper member such as shown in Fig. 6, but with a modified form of shaper mounted thereon;

Fig. 9 is a perspective of the modified form of supplemental shaper shown in Fig. 8;

Fig. 10 is a perspective of the movable shaper member shown at the left of Fig. 4;

Fig. 11 is a perspective of a modified form of shaper such as is shown in Fig. 10;

Fig. 12 is a perspective of a circular wire cage such as would be suitable for being shaped in the machine shown in the earlier figures of the drawings.

The circular wire cage shown in Fig. 12 would be formed from a section of wire mesh unwound from a roll and having its ends secured together to form a circular ring. Wire cage is indicated generally by the numeral 20. Certain portions of the wires which constitute the cage are shown as cut and bent outwardly as at 22 to provide projections that would be embedded within a concrete ring cast about the cage. It is understood that in the casting of concrete rings a wire cage of the character shown in Fig. 12 is commonly supported within the mold. The projections 22 being of equal length space the cage from one wall of the mold. If two cages are used within the ring being formed one cage would be of larger diameter than the other so that one cage would be supported spaced from the outer wall of the mold and the other cage would be supported spaced from the inner wall thereof. A cage such as shown in Fig. 12 would be used if the pipe section being cast were of circular shape.

This invention relates to a machine and process for shaping a circular cage 20 into an elliptical form. The precise form of the ellipse would depend upon the shape of the concrete ring within which the cage is to be used as a reinforcement.

The machine comprises a table 24 mounted upon suitable legs 26. Two of these legs might be provided at each end of the table suitably braced to properly support the table. Mounted upon the top of the table adjacent one end is a shaper or thrust element 28. This shaper is fixed securely upon the table in any suitable manner. It is shown in the drawings as being of the arcuate shape in cross section. The shaper would be formed of suitable impact resisting metal.

A pair of rolls 30 are mounted upon the top of the table extending lengthwise thereacross, as shown in Figs. 1, 4 and 5. These rolls support a carriage or weighted ram-like structure 32 which is mounted upon wheels 34, which wheels travel upon the rolls as shown in Figs. 4 and 5. This carriage carries a shaper 36 which is complementary to the shaper 28 and is supported upon the carriage by a block 38 and struts 40 and 42, as shown particularly in Fig. 10.

In order to provide for reciprocation of the carriage so as to move its shaper 36 toward and away from the stationary shaper 28, the table is provided with a slot 44 extending lengthwise thereof between the rolls 30. A pair of web plates 46 depend from the carriage 32 through the slot 44, as shown particularly in Figs. 4 and 5, and an actuating bar in the form of a pipe 48 is secured between these plates 46 and extend lengthwise underneath the table terminating in a handle 50 whereby the carriage may be manually reciprocated. It will appear that the carriage or ram member 32 is a heavy metal block and serves as an impact or thrust member when it is reciprocated in a manner which will hereinafter be described. A bumper element 52 is shown in Fig. 4 as mounted underneath the table on one of the cross frame members to take the impact of the carriage as it is actuated to move the shaper elements 28 and 36 apart. A second bumper element 54 is supported within the stationary shaper 28, as shown in Figs. 4 and 6, to take the impact of the adjacent end of the carriage 32 as the two shaper elements are moved toward each other.

In the shaping of a circular wire cage into an elliptical form it is frequently desirable to impart contours of different dimensions to the cage and to assist in determining when the cage has attained the desired contour there is provided on the top of the table certain indicating points which in the present instance constitute rivets 56, as shown in Figs. 1 and 3. Such rivets are arranged in a succession of corresponding series on opposite sides of the line of reciprocation of the shapers, as shown in Fig. 1. In Fig. 1 in dotted line there is illustrated the position of a circular wire ring by the numeral 58. There is then illustrated the shape of such ring when it has been brought into one elliptical contour indicated by the numeral 60 and there is also illustrated the shape of the ring when it has been brought into another elliptical contour indicated by the numeral 62. It will be seen that these rivets 56 are disposed in arcuate series so as to indicate these contours. The numeral 63 indicates the position and shape of the wire cage when it has been withdrawn to line up with a series of indicating points to determine whether it has been brought to the correct shape.

In order to shape rings of different size and having different end contours, supplemental shaper or thrust members may be provided. In Figs. 7, 8 and 9 two sets of supplemental shapers are shown. Fig. 7 illustrates a supplemental shaper which is indicated by the numeral 64. This is an arcuate plate reinforced by an arcuate internal brace 66 at the bottom and a second arcuate internal brace 68 adjacent to the top and a cross member 70. It will be noted that the shaper 28 is cut away providing a shoulder 72 and the supplemental shaper 64 is received about the shaper 28 with the brace member 70 disposed within the cut away part 72 and the arcuate reinforcing members 66 and 68 bearing against the outer surface of the shaper 28.

Figs. 8 and 9 illustrate a modified form of supplemental shaper which is here shown as of larger size. This shaper is indicated by the numeral 74. It is provided with arcuate reinforcing elements 76 and axially extending reinforcing elements 78 and supplemental brace members 80. This supplemental shaper is designed to be received about the shaper 28 in the manner shown in Fig. 8 and may be secured thereto by a threaded stud 82 extending through an opening 84 in the stationary shaper 28 and provided with a fastening nut as shown in Fig. 8.

Supplemental shapers of the same character may be provided for the movable shaper 36 carried by the carriage and secured to such movable shaper in the same manner.

Fig. 11 shows a modified form of shaper modified as compared with the shapers shown in Figs. 2 and 10. This is an arcuate shaper 86 of the same general shape. It is provided with a bottom portion 88 and this bottom portion is provided with studs 90. These studs may be received through apertures 92 provided in the carriage 32, as shown in Fig. 11, and the brace 40 might be fastened with a bolt or the like to the shaper, such bolt being extended through the openings 94 in the end of the brace and the shaper itself, as shown in Fig. 11. Such a shaper might be fixed on a table in lieu of the shaper shown in Fig. 4. If such shaper were used a series of shapers of this character of different arcuate dimension could be provided and replaced one for the other when desired.

In carrying out my improved process with the mechanism hereinabove described, a circular wire cage 20 is formed from suitable wire mesh. The opposite ends of the strip of mesh may be fastened together in any suitable manner and prongs or projections 22 may be bent outwardly, as shown. This circular wire cage is then placed upon the table 24, as shown at 58 in Fig. 1 in dot and dash line. It is placed on the table so as to encircle the shapers 28 and 36.

Through withdrawal of the handle 50 the carriage 32 is withdrawn to move the shapers 28 and 36 toward each other. The handle is then thrust sharply in the opposite direction moving the shapers apart and the shaper 36 strikes the inside of the wire cage elongating the cage, as shown in the double dot and dash lines 60 and 62. Repeated impacts of the movable shaper against the interior of the cage causes the cage to assume a position such as is shown at 60 in Fig. 1. It will be seen that when the cage assumes the elongate position 60 that it is lined up interiorly of a series of indicating points 56. If a more elongate shape is desired the shaper 36 may be actuated to elongate the cage to the shape shown by the double dot and dash line 62. To determine whether the cage has reached the desired elongate contour the cage may be withdrawn to the position shown by the single dot and dash line 63. It will be seen that this dot and dash line is along the inside of a series of indicating points 56 and indicates that the cage has assumed this desired shape.

If a different arcuate curvature is desired or a larger cage is being handled, the supplemental shaper elements heretofore described and indicated by the numerals 64 and 74 may be disposed about the shaper elements 28 and 36 and the cage shaped under impact of these supplemental shaper elements.

What I claim is:

1. Wire cage forming mechanism comprising, in combination, a table provided with a straight trackway, an arcuate shaper supported in an upright position on the table at one end of the trackway with its convex surface facing away from the trackway, a weighted carriage supported upon the trackway for reciprocation thereover, a complementary arcuate shaper supported in an upright position upon that end of the carriage remote from the first shaper and with its convex surface facing away from the first shaper, said table provided with a slot therethrough below the trackway, an operating handle disposed beneath the table and coupled with the carriage through the slot, said handle extending parallel to the trackway toward the first mentioned shaper and projecting therebeyond.

2. Wire cage forming mechanism comprising, in combination, a table provided with a straight trackway, an arcuate shaper supported in an upright position on the table at one end of the trackway with its convex surface facing away from the trackway, a weighted carriage supported upon the trackway for reciprocation thereover, a complementary arcuate shaper supported in an upright position upon that end of the carriage remote from the first shaper and with its convex surface facing away from the first shaper, said table provided with a slot therethrough below the trackway, an operating handle disposed beneath the table and coupled with the carriage through the slot, said handle extending parallel to the trackway toward the first mentioned shaper and projecting therebeyond, said table provided adjacent to opposite ends of the trackway with a plurality of complementary arcuate opposed series of indicating points, each of said series of indicating points extending across said trackway and appearing on both sides thereof.

3. Wire cage forming mechanism comprising, in combination, a table provided with a straight trackway, an arcuate shaper supported in an upright position on the table at one end of the trackway with its convex surface facing away from the trackway, a weighted carriage supported upon the trackway for reciprocation thereover, a complementary arcuate shaper supported in an upright position upon that end of the carriage remote from the first shaper and with its convex surface facing away from the first shaper, said table provided with a slot therethrough below the trackway, an operating handle disposed beneath the table and coupled with the carriage through the slot, said handle extending parallel to the trackway toward the first mentioned shaper and projecting therebeyond, a pair of complementary supplemental shapers one for each of said first mentioned shapers, each supplemental shaper being formed on a radius of greater length than the radius of its first mentioned shaper, each supplemental shaper provided with internal arcuate reinforcement adjacent each end thereof and with internal axially extending circumferentially spaced reinforcements associated with the arcuate reinforcements, said reinforcements adapted to seat against the convex face of the first mentioned shaper with which the supplemental shaper is associated.

4. Wire cage forming mechanism comprising, in combination, a table provided with a straight trackway, an arcuate shaper supported in an upright position on the table at one end of the trackway with its convex surface facing away from the trackway, a weighted carriage supported upon the trackway for reciprocation thereover, a complementary arcuate shaper supported in an upright position upon that end of the carriage remote from the first shaper and with its convex surface facing away from the first shaper, said table provided with a slot therethrough below the trackway, an operating handle disposed beneath the table and coupled with the carriage through the slot, said handle extending parallel to the trackway and outside the periphery of the table.

References Cited in the file of this patent
UNITED STATES PATENTS

| | | |
|---|---|---|
| 602,931 | Batey | Apr. 26, 1898 |
| 756,832 | Cleveland | Apr. 12, 1904 |
| 919,371 | Mitchell | Apr. 27, 1909 |
| 1,054,022 | Neller | Feb. 25, 1913 |
| 1,239,165 | Davis | Sept. 4, 1917 |
| 1,265,102 | Morris | May 7, 1918 |
| 1,307,735 | Hank | June 24, 1919 |
| 1,435,679 | Young | Nov. 14, 1922 |
| 2,492,360 | English | Dec. 27, 1949 |